US011963922B2

(12) United States Patent
Lippman et al.

(10) Patent No.: US 11,963,922 B2
(45) Date of Patent: Apr. 23, 2024

(54) WALKING ASSISTANCE DEVICES AND REHABILITATION SYSTEMS

(71) Applicant: WALQER LLC, Newburgh, IN (US)

(72) Inventors: David Lippman, Newburgh, IN (US); Phillip Behrens, Los Angeles, CA (US)

( * ) Notice: Subject to any disclaimer, the term of this patent is extended or adjusted under 35 U.S.C. 154(b) by 286 days.

(21) Appl. No.: 17/497,219

(22) Filed: Oct. 8, 2021

(65) Prior Publication Data

US 2022/0110817 A1 Apr. 14, 2022

Related U.S. Application Data

(60) Provisional application No. 63/089,273, filed on Oct. 8, 2020.

(51) Int. Cl.
*A61H 3/02* (2006.01)

(52) U.S. Cl.
CPC ....... *A61H 3/02* (2013.01); *A61H 2201/0153* (2013.01); *A61H 2201/0157* (2013.01); *A61H 2201/164* (2013.01)

(58) Field of Classification Search
CPC ................................ A45B 9/04; A61H 3/0288
See application file for complete search history.

(56) References Cited

U.S. PATENT DOCUMENTS

| | | | | | |
|---|---|---|---|---|---|
| 934,228 | A | | 9/1909 | Sperring et al. | |
| 1,183,008 | A | * | 5/1916 | Hipwood | A61H 3/0277 135/83 |
| 3,738,674 | A | * | 6/1973 | Pauls | A61H 3/0288 135/70 |
| 4,493,334 | A | * | 1/1985 | Semanchik | A45B 9/00 135/84 |
| 4,899,771 | A | * | 2/1990 | Wilkinson | A45B 9/04 135/84 |
| 5,103,850 | A | | 4/1992 | Davis et al. | |
| 5,224,506 | A | | 7/1993 | Allen et al. | |
| 5,353,825 | A | | 10/1994 | Davis | |
| 5,411,045 | A | | 5/1995 | Davis | |
| 5,699,819 | A | | 12/1997 | Simons | |
| 5,829,463 | A | | 11/1998 | Galan | |
| 7,360,547 | B2 | * | 4/2008 | Carlson | A45B 9/04 135/84 |

(Continued)

FOREIGN PATENT DOCUMENTS

| | | | |
|---|---|---|---|
| CA | 2855329 | A1 | 12/2015 |
| FR | 2978031 | A1 | 1/2013 |

OTHER PUBLICATIONS

Fregly, Haptic Gait Retraining for Knee Osteoarthritis Treatment, Oct. 2007.

(Continued)

*Primary Examiner* — Noah Chandler Hawk
(74) *Attorney, Agent, or Firm* — Brannon Sowers & Cracraft PC

(57) ABSTRACT

Walking assistance devices and systems for rehabilitation system for reducing the knee adduction moment in a user, reducing stress on the knee, and potentially slowing deterioration of the knee associated with osteoarthritis of the knee and delaying the need for knee replacement surgery. In one embodiment the walking assistance device includes a handle or grip portion, a shaft portion, and a base portion having a rocker bottom which reduces the knee adduction moment on the stance leg of a user.

10 Claims, 9 Drawing Sheets

(56) References Cited

U.S. PATENT DOCUMENTS

| | | | | |
|---|---|---|---|---|
| D628,791 | S | 12/2010 | Ozuna et al. | |
| 8,408,224 | B2 | 4/2013 | Ozuna et al. | |
| 8,662,094 | B2 | 3/2014 | Amladi | |
| 8,778,031 | B1 | 7/2014 | Latour et al. | |
| 8,789,547 | B1 | 7/2014 | Reda | |
| 8,844,548 | B2 | 9/2014 | Soletski et al. | |
| 9,750,973 | B1 | 9/2017 | Yang | |
| 9,763,848 | B1 | 9/2017 | Handzic et al. | |
| 10,039,688 | B1 | 8/2018 | Epp | |
| 10,064,464 | B1 | 9/2018 | Birnbaum | |
| 10,206,467 | B1 * | 2/2019 | Swerdlow | A45B 9/00 |
| 10,632,006 | B2 | 4/2020 | Elbaz et al. | |
| 10,849,395 | B2 | 12/2020 | Aubin et al. | |
| 10,993,639 | B2 | 5/2021 | Herr et al. | |
| 2007/0169308 | A1 | 7/2007 | Chiu | |
| 2010/0175730 | A1 * | 7/2010 | Ruddy | A45B 9/04 135/77 |
| 2017/0156458 | A1 | 6/2017 | Hayden | |
| 2017/0311688 | A1 * | 11/2017 | Chen | A61H 3/0288 |
| 2018/0055163 | A1 * | 3/2018 | Rudin | A45B 7/005 |
| 2019/0343251 | A1 * | 11/2019 | FitzPatrick | A45B 9/04 |

OTHER PUBLICATIONS

Mercado, Smart Cane: Instrumentation of a quad cane with audio-feedback monitoring system for partial weight-bearing support, Jun. 2011.

Sesar, A Preliminary Analysis of Gait Performance of Patients with Multiple Sclerosis using a Sensorized Crutch Tip, Jul. 2020.

Schuster, A novel walking cane haptic biofeedback reduces knee adduction moment in the osteoarthritic knee, Nov. 2020.

* cited by examiner

WALKING ASSISTANCE DEVICES AND REHABILITATION SYSTEMS

CROSS-REFERENCE TO RELATED APPLICATIONS

The present application claims priority to U.S. Provisional Patent Application No. 63/089,273 filed on Oct. 8, 2020, the disclosure of which is incorporated herein by reference.

TECHNICAL FIELD

The present disclosure relates generally to walking assistance devices and more particularly to canes and rehabilitation systems associated therewith.

BACKGROUND

Osteoarthritis affects 27 million Americans, with the knee being the most affected joint. Within the knee, the medial compartment is most commonly affected. The patellofemoral and lateral knee compartments are affected but to a lesser degree. Risk factors for knee osteoarthritis include age, gender, obesity, and trauma. In fact, symptomatic knee osteoarthritis occurs in 10% of men and 13% of women aged 60 years or older. The lifetime risk of developing symptomatic knee osteoarthritis is about 40% in men and 47% in women. BMI is the most concerning modifiable risk factor. Approximately 60% of subjects with body mass index (BMI) of 30 or higher experience symptomatic knee arthritis.

The first line treatment for symptomatic knee osteoarthritis includes non-steroidal anti-inflammatory drugs, weight loss, and activity modification with the use of assistive walking devices. Surgical intervention is reserved for severe cases that fail exhaustive non-operative management. Operative treatment includes uni-compartmental or total knee arthroplasty; however, surgical treatment is associated with high cost, severe adverse events, and only yields good or excellent results in 75-80% of patients. The use of an assistive walking device, such as a cane, has been associated with decreased knee joint reactive forces, reduced mechanical load on the medial compartment, decreased pain, and increased function. Recent studies have shown that cane use decreased the knee joint reactive force by up to 50%. Although cane use has demonstrated clinically significant benefits in knee osteoarthritis, the prevalence of cane use remains low. Barriers to cane use include psychosocial pressure, improper technique, aesthetic look, and cumbersome nature. Improper technique is particularly important (i.e., holding the cane in the hand on the same side as the affected knee). A cane should be used as a walking assistive device, held in the hand on the opposite side of the affected knee. Most sufferers of knee osteoarthritis only use a cane once the pain becomes severe, and thus cane use is often only a bridge before the inevitable knee replacement. In doing so, patients fail to experience the full benefits of the device.

One such walking assistance device is disclosed in U.S. Pat. No. 9,763,848 to Handzic et al. ("Handzic"). Handzic teaches a walking assistance device having a handle assembly with a grip and shaft attached to a tip assembly. The tip assembly includes a curved outer surface for contacting the ground having a non-constant radius which changes as a function of the angular position of the outer curved surface relative to the ground. While this and other devices may allow for walking assistance for patients suffering from certain conditions, there remains ample room for improvement and development of alternative strategies for assisting sufferers of osteoarthritis of the knees.

SUMMARY OF THE INVENTION

In one aspect, a method of customizing a cane system for a patient so as to reduce the knee adduction moment of a patient where the cane system is placed in a first assembly configuration having a first combination of rocker bottom foot profile, shaft length, shaft angle, and return spring force in a return spring coupled between a rocker bottom foot and a handled shaft, the a knee adduction moment in a patient user ambulating with the use of the cane system in the first assembly configuration is then monitored, the cane system is then adjusted from the first assembly configuration to a second assembly configuration having a second combination of rocker bottom foot profile, shaft length, shaft angle, and return spring force, the a knee adduction moment in a patient user ambulating with the use of the cane system in the second assembly configuration is then monitored, and the cane system is then customized to the patient user based on the knee adduction moment of the patient user in each of the first assembly configuration and the second assembly configuration.

In another aspect, a cane system having at least one handled shaft, at least one rocker bottom foot, a connecting structure for coupling the handled shaft to the at least one rocker bottom foot, and at least one return spring positionable in the connecting structure is customized to a patient user by adjusting the cane system among a plurality of different assembly configurations, each of the assembly configurations including a different combination of rocker bottom foot profile, shaft length, shaft angle, and return spring force, then monitoring a knee adduction moment in a patient user ambulating with the cane system in each one of the plurality of different assembly configurations, then determining a knee adduction moment of least magnitude in the patient user based on the monitoring of the knee adduction moment, then associating the knee adduction moment of least magnitude with one of the plurality of different assembly configurations, and finally customizing the cane system to the user in the one of the plurality of different assembly configurations associated with the knee adduction moment of least magnitude.

In still another aspect, a walking assistance device comprises a handle portion, a shaft portion operationally connected to the handle portion, and a base portion operationally connected to the shaft portion, the base portion comprising a bottom surface adapted to contact the ground or a floor surface, the bottom surface defining a continuous, uninterrupted surface having a curved front portion, a flat middle portion, and a curved back portion, the curve of the front portion and the curve of the back portion are explicitly configured to apply assistive forces that assist the user at predetermined points in the user's gait.

DETAILED DESCRIPTION

Figure 1:
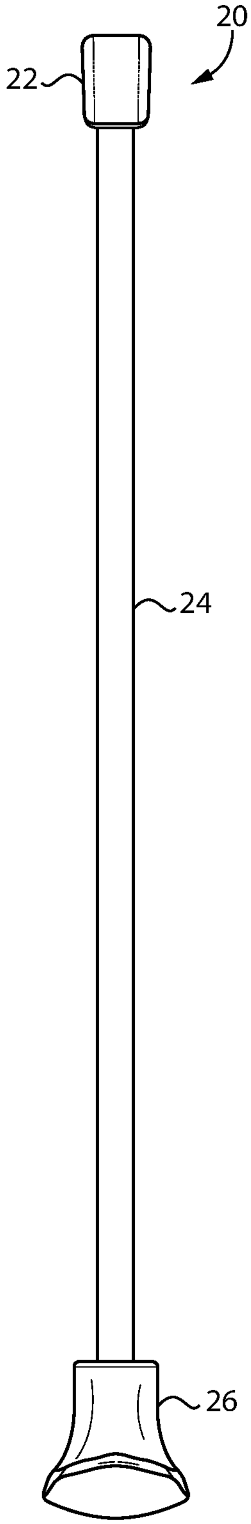
FIG. 1 is a front view of a walking assistance device, according to one embodiment.
Figure 2:
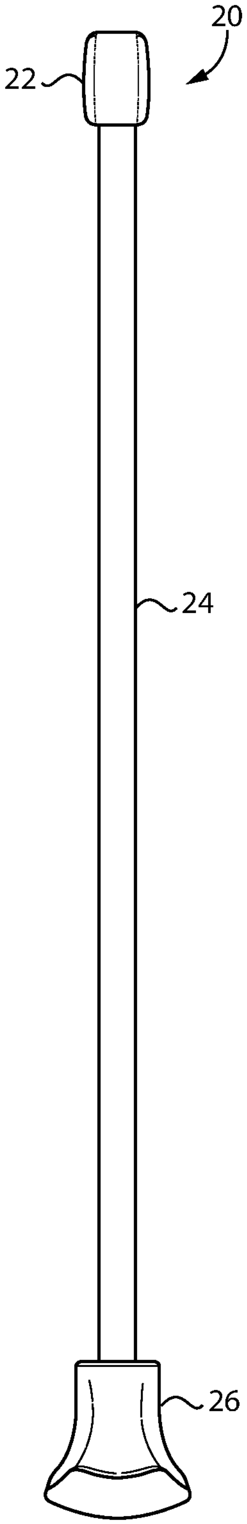
FIG. 2 is a rear view of a walking assistance device, according to one embodiment.
Figure 3:
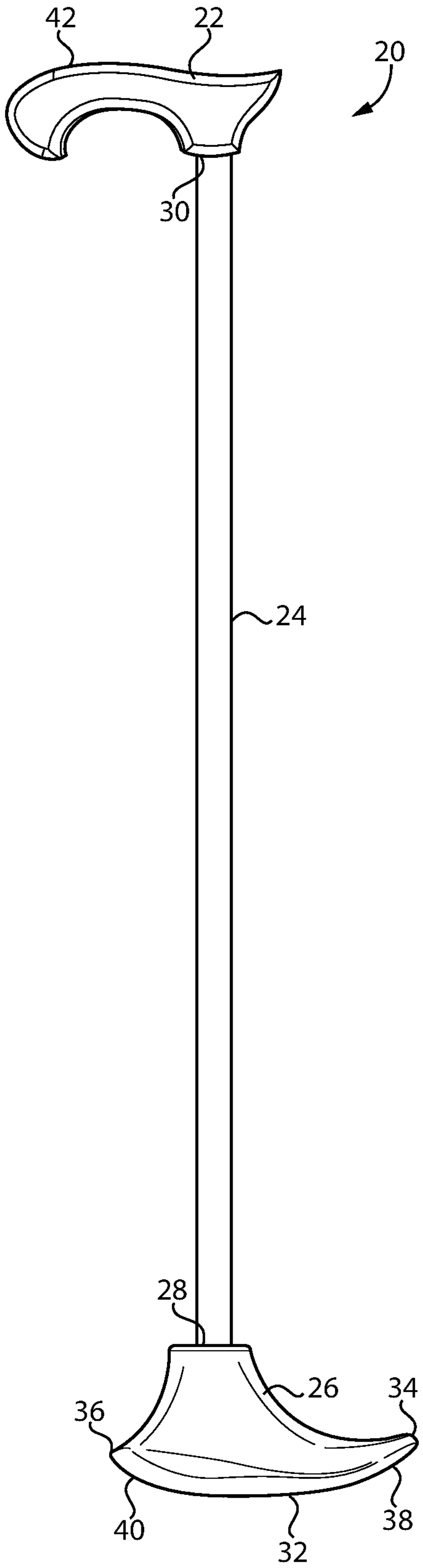
FIG. 3 is a right side view of a walking assistance device, according to one embodiment.
Figure 4:
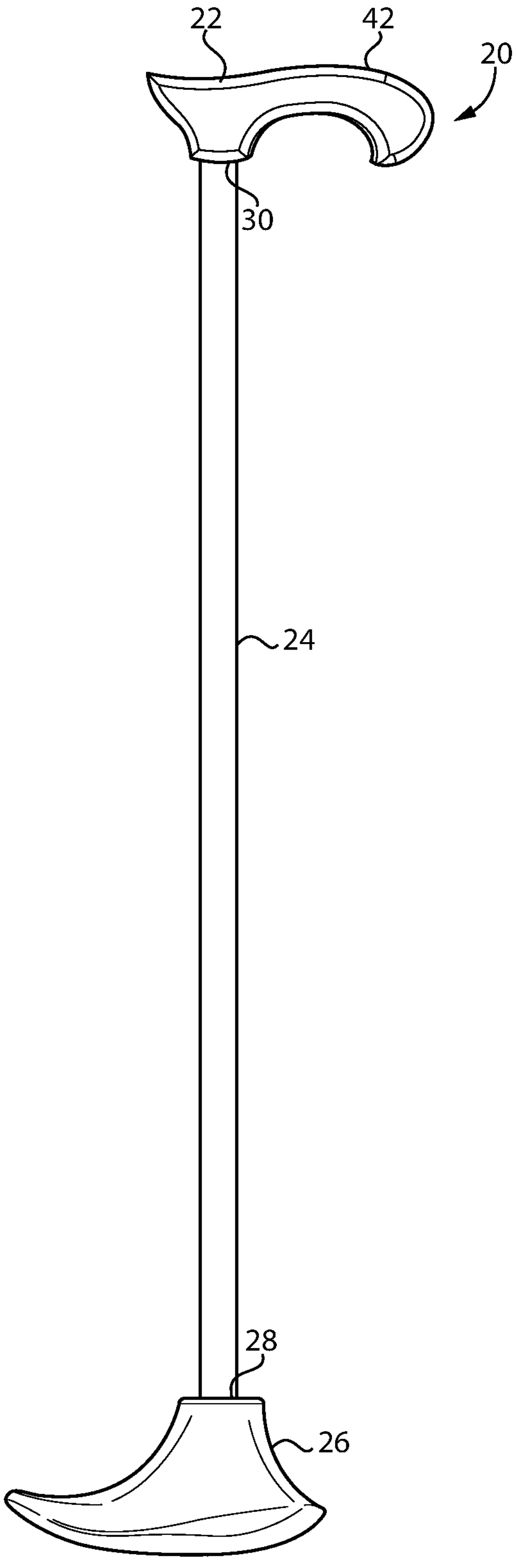
FIG. 4 is a left side view of a walking assistance device, according to one embodiment.
Figure 5:
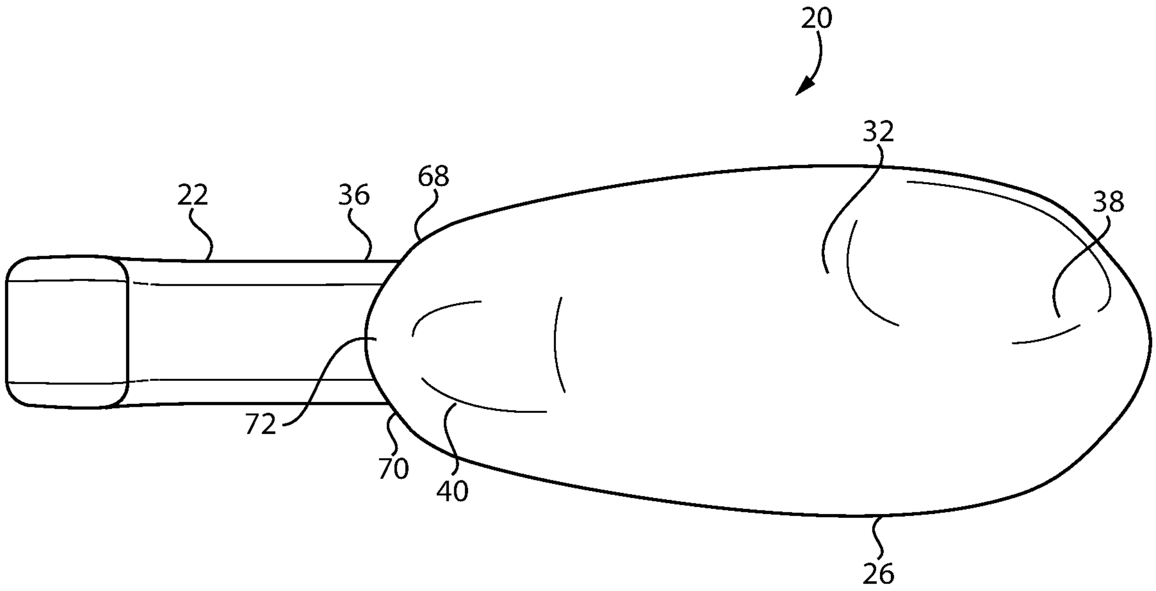
FIG. 5 is a bottom view of a walking assistance device, according to one embodiment.
Figure 6:
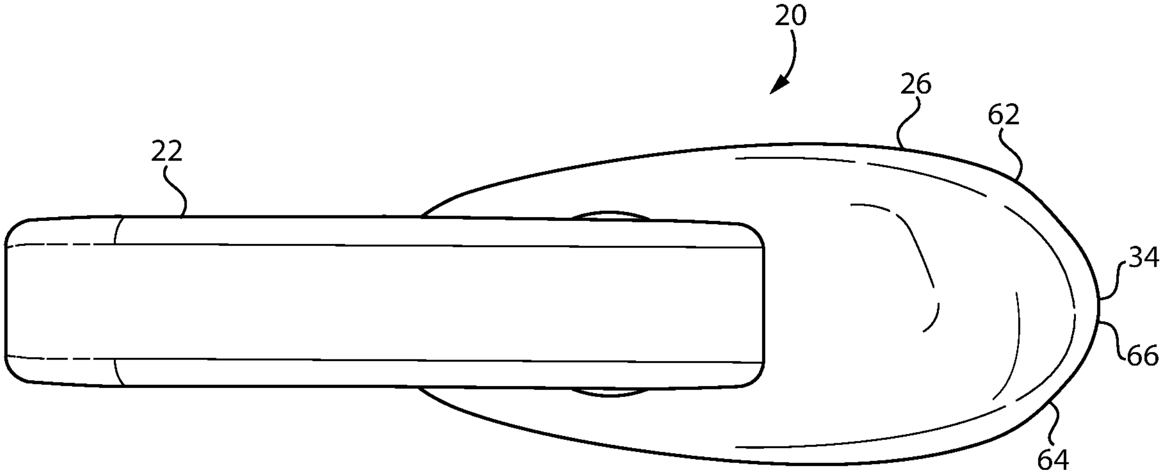
FIG. 6 is a top view of a walking assistance device, according to one embodiment.

The walking assistance devices and rehabilitation systems disclosed herein include devices which demonstrate biomechanical advantage (e.g., decreased medial compartment forces), clinical benefits (e.g., decreased pain, increased function), and faster walking speeds. Recognizing that a device which is infrequently or incorrectly used by a patient will provide little to no therapeutic benefit, the devices disclosed also may have produce an aesthetically pleasing design, improved ease of use, and increased user comfort to encourage proper and consistent use.

Referring now to FIGS. 1-6, a walking assistance device 20 such as a cane according to one embodiment is shown from various angles. The walking assistance device 20 includes a handle portion 22, a shaft portion, and a base portion 26. The handle portion 22 includes a grip 42 and is operationally connected 30 to the shaft portion 24 using a suitable attachment method. The attachment method may include a receiving portion in one of the handle or shaft into which a threaded portion of the other is screwed, glue, epoxy, removable fasteners, an interference fit, or other suitable methods. In other embodiments, the shaft portion and handle portion may be formed as a unitary piece. The grip 42 is shown as a contoured style grip made from a hard material such as metal, plastic, wood, and the like. In other embodiments the grip may be straight, curved, or some other suitable shape and may be made from hard materials and/or covered with a softer material such as foam, soft plastic, and the like.

Figure 12:
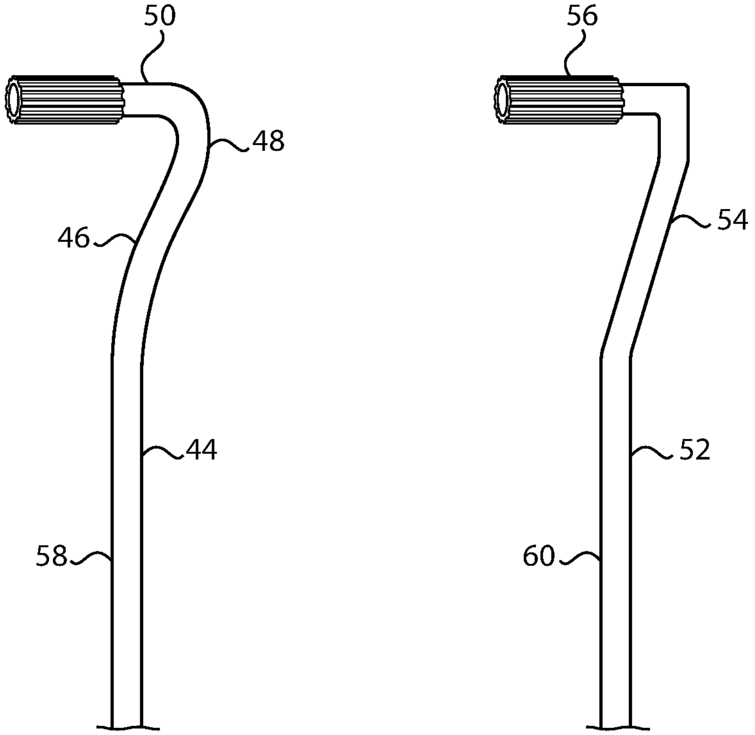
FIG. 12 is a side view of shaft and handle portions of walking assistance devices, according to alternative embodiments.

The shaft portion 24 in this particular embodiment is generally straight and is a single piece of material such as metal, wood, plastic, and the like. In other embodiments the shaft portion may be two or more pieces operationally joined such that the length of the shaft portion may be adjusted such that overall length of the walking assistance device has a desired length. The shaft portion 24 is operationally connected 28 to the base portion 26 using a suitable attachment method such as a receiving portion in one of the shaft or base into which a threaded portion of the other is screwed, glue, epoxy, removable fasteners, an interference fit, or other suitable methods. In this embodiment the shaft is shown as generally straight, but on other embodiments a portion of the shaft may be curved or disposed at an angle relative to the other portion of the shaft. Examples of such alternative shaft designs as shown in FIG. 12. In one such example a shaft 58 includes a straight shaft portion 44 and an angled shaft portion 46 which includes a curved portion 48 operationally connected to a handle portion 50. The exact size, length, angle, and curved radius of each portion may vary from one embodiment to the next as desired. In another example, a shaft 60 includes a straight portion 52 and an angled portion 54 which is operationally connected to a handle portion. The exact size, length, and angle of each portion may vary from one embodiment to the next as desired.

Figure 7:
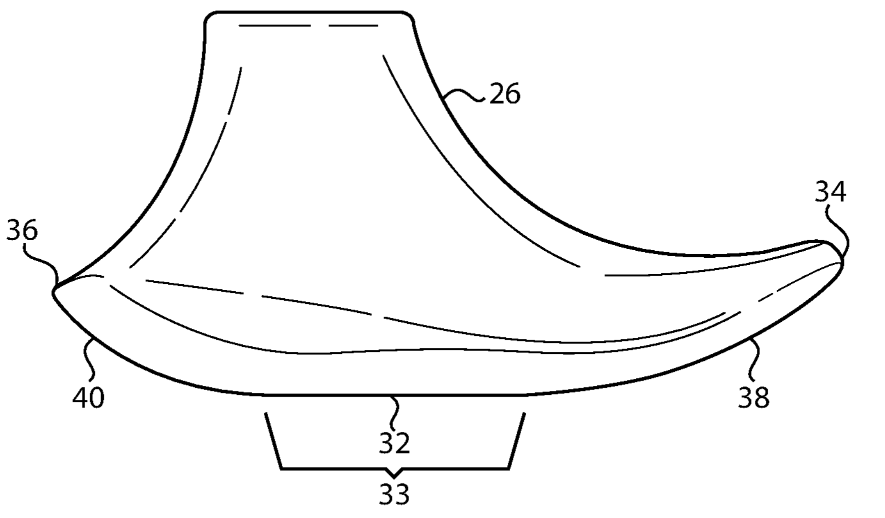
FIG. 7 is a right side view of a base portion for a walking assistance device, according to one embodiment.

FIG. 7 shows a side view of the base portion 26 of the walking assistance device 20 shown in FIGS. 1-6. In this example, the base portion 26 has a front 34 and a back 36 joined by a bottom surface 32. Bottom surface 32 includes a generally flat portion 33, a front curved portion 38 which convexly curves upward towards the base front 34, and a back curved portion 40 which convexly curves upward towards the base back 36. In one example the generally flat bottom portion is sized such that the walking assistance device is free standing when placed on a flat surface. Front curved portion 38 has a different curve radius than back curved portion 40, although the exact radius of each curved portion may differ between different embodiments. In one example a patient may be given a first walking assistance device, the patient's gait while using the device is studied, then the patient is given a second walking assistance device having a different front curved portion and back curved portion from the first device so as to increase the device's impact on the knee adduction moment of the patient.

In this particular embodiment, the flat portion 33 of the base 26 is sufficiently large that the walking assistance device 20 is capable of free standing when placed on a level surface. In this particular example bottom surface 32 is relatively smooth, but in other embodiments the surface may be textured so as to prevent slippage on surfaces. The edges 62, 64 of the base front 34 are formed such that they taper towards a front toe 66 or point. The edges 68, 70 of the base back portion 36 are generally curved so as to form a rounded heel 72. In one example the curve of the base front and base back portions are consistent across the width of the base (i.e., from left to right). In other examples the curve of the base front and base back portions may vary from left to right so as to further increase the device's impact on a particular patient's knee adduction moment if a patient might benefit from increased medial or lateral support. The base portion may be made from a single material such as metal, plastic, rubber, and the like or it may be made from two or more materials such as having a metal core covered by a rubber outer surface. In one example the bottom surface of the base portion is textured and/or made from a material which increases grip between the bottoms surface of the base portion and walking surfaces (floors, sidewalks, ground, and the like).

Figure 8:
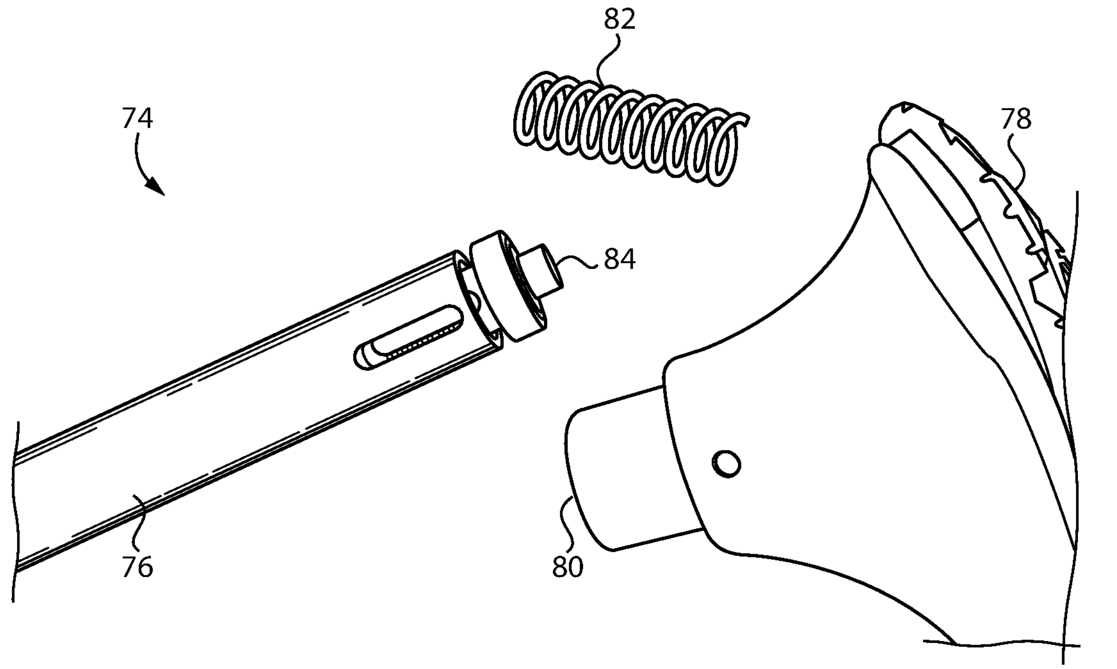
FIG. 8 is a side view of a partially disassembled base portion and shaft portion for a walking assistance device, according to another embodiment.
Figure 9:
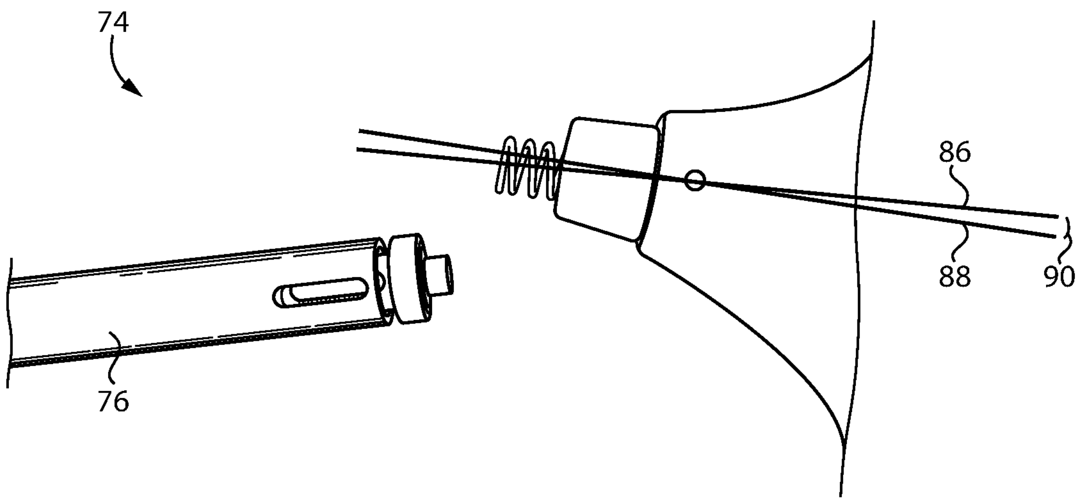
FIG. 9 is a side view of a partially disassembled base portion and shaft portion for a walking assistance device, according to another embodiment.

FIGS. 8-9 show another example of walking assistance device 74 having a shaft portion 76 and a base portion 78. The walking assistance device 74 is shown partially disassembled to show a spring 82 which may be disposed between the base portion 78 and the shaft portion 76 so as to absorb shock and partially unload downward forces when using the device. The exact size and tension of the spring may vary as desired. In this example, the spring 82 is disposed within an attachment receptacle 80 in the base portion 78. The shaft portion 76 includes a spring lug 84 for engaging the spring 82. The centerline of the spring 88 is offset 90 from the centerline of the base portion attachment receptacle 86 (which is generally vertical to the ground). The angle of the offset 90 can vary from embodiment to embodiment, but generally is from 15 degrees to 20 degrees from vertical.

Figure 10:
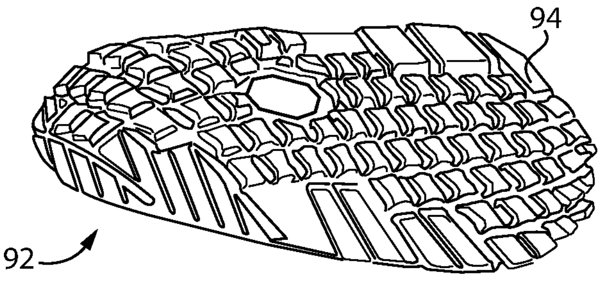
FIG. 10 a bottom perspective view of a walking assistance device, according to one embodiment.
Figure 11:
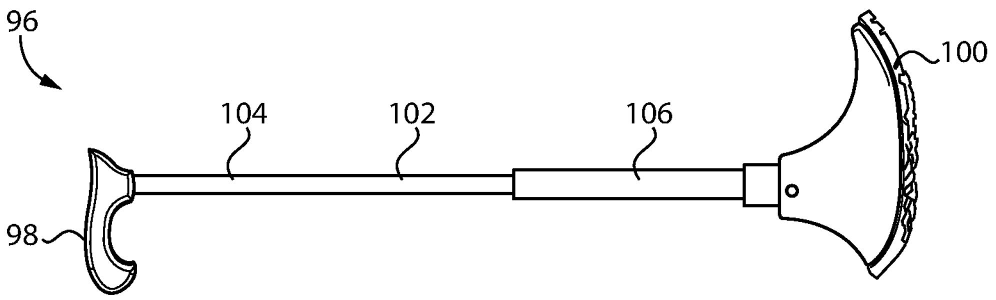
FIG. 11 is a right view of a walking assistance device, according to one embodiment.

FIG. 10 shows a walking assistance device 92 having a base portion 94 with a textured lower surface to improve grip between the base and surfaces. The specific pattern shown in FIG. 10 is for illustrative purposes only and other patterns/textures may also be used. FIG. 11 shows a walking assistance device 96 having a handle portion 98 and a base portion 100 operationally connected by a shaft portion 102. In this particular example, the shaft portion 102 include s first/upper shaft portion 104 and a second/lower shaft portion 106. The length of the shaft portion 102, and therefore the overall length of the walking assistance device 96, is adjustable. In this particular example the connection between the first shaft portion 104 and the second shaft portion 106 may be loosened and part of the first shaft portion 104 slid into/out of the body of the second shaft portion 106 until the desired length of the shaft portion 102 is achieved. The connection between the first shaft portion 104 and the second shaft portion 106 may then be locked and the overall length of the shaft portion 102 fixed at the desired length.

INDUSTRIAL APPLICABILITY

Figure 13:
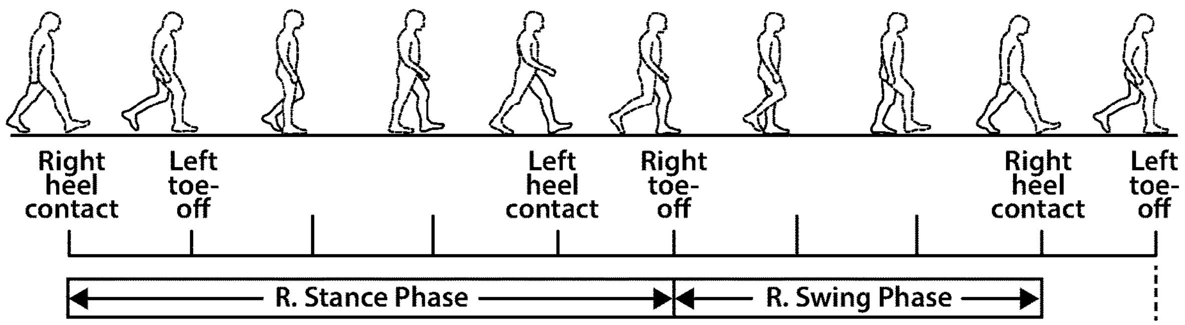
FIG. 13 is a schematic illustration of a person walking.
Figure 14:
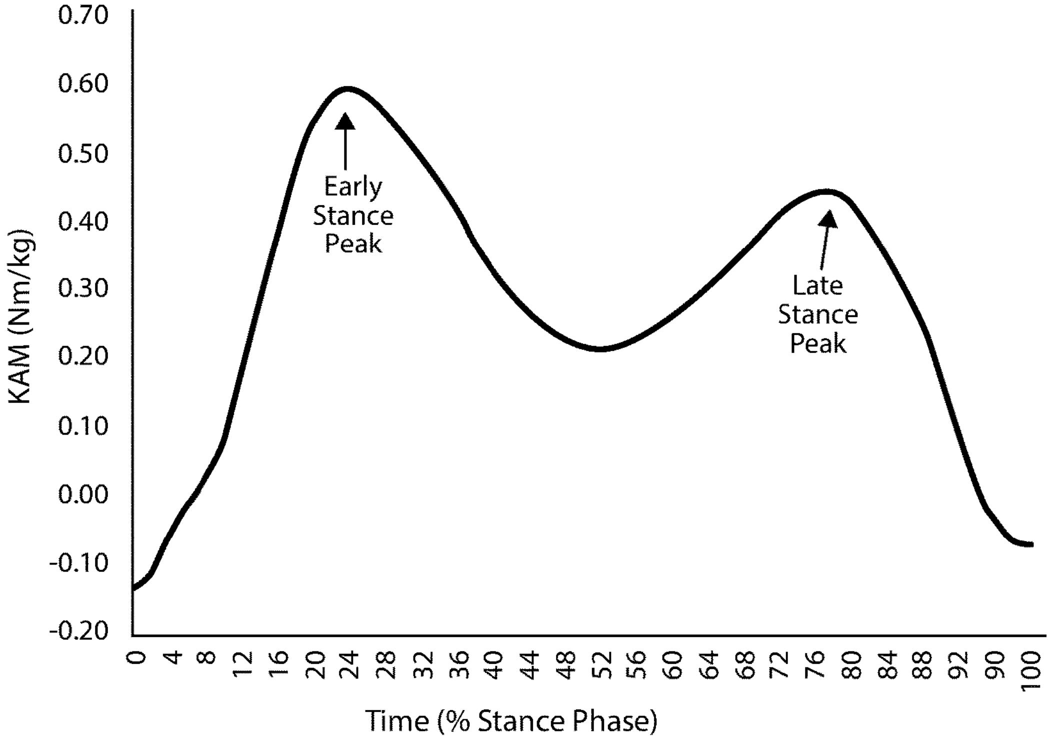
FIG. 14 is a graph showing the knee adduction moment in a person while walking.

FIG. 13 shows a schematic illustration of a person walking. The knee adduction moment potentially increases pressure on the medial compartment of the knee and thus may be a primary cause for the development of medial compartment osteoarthritis of the knee. Further, increased knee adduction moment is associated with increased medial compartment knee osteoarthritis. A normal gait cycle is divided into a stance phase and a swing phase. The stance phase constitutes 60% of the total gait and may be partitioned into initial contact, loading response (heel contact with the ground), mid-stance, terminal stance and pre-swing (or lift toe off the ground). As shown in FIG. 14, the knee adduction moment has two peaks, one right after heel strike and one at the transition from terminal stance to pre-swing.

Figure 15:
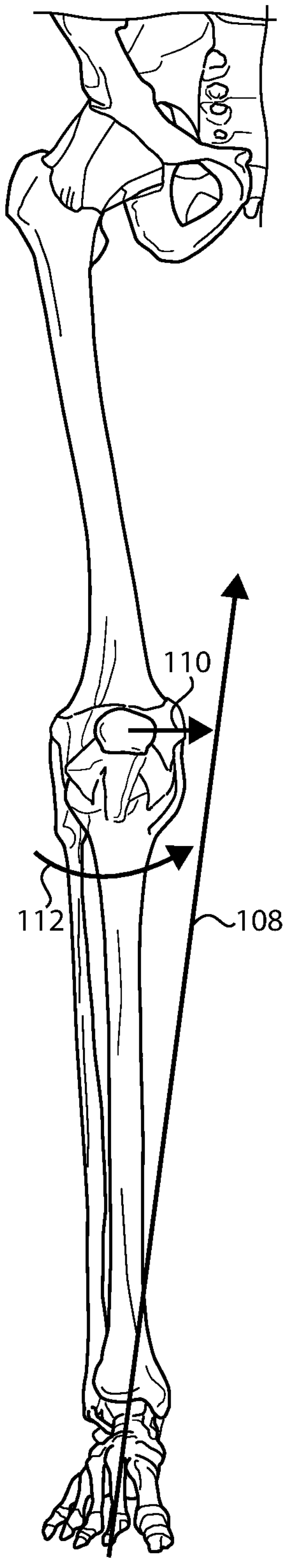
FIG. 15 is a front view of the bones of a human leg while walking.
Figure 16:
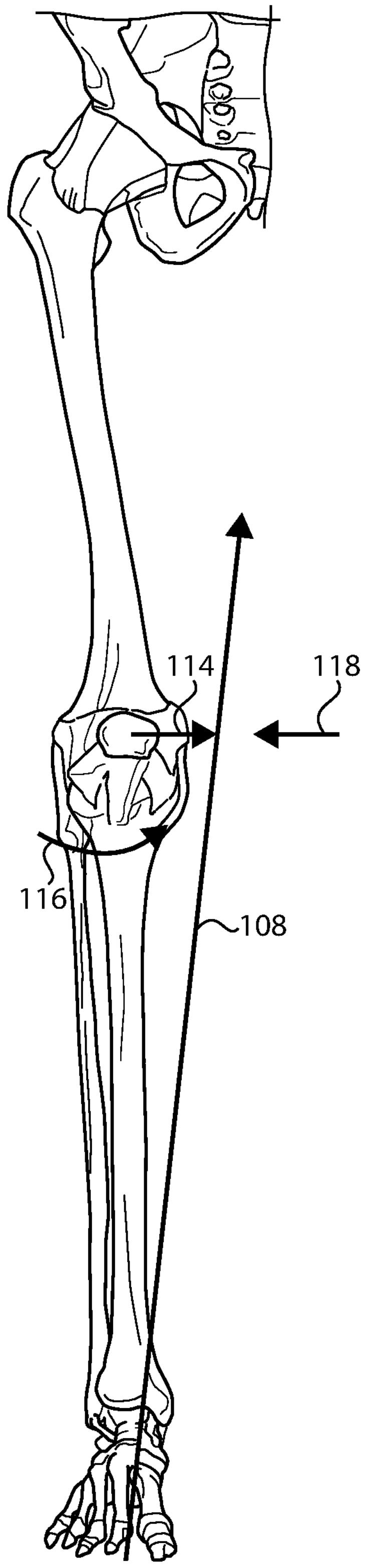
FIG. 16 is a front view of the bones of a human leg while walking and using one of the disclosed walking assistance devices.

The knee adduction moment is illustrated in FIG. 15. While walking weight that is placed on the leg causes an equal and opposite ground reaction force 108 upward through the leg. This force is not straight up the leg but slightly off center which causes a moment arm 110 in the knee towards the centerline of the body. The knee adduction moment 112 is generated as a twisting of the knee towards the centerline of the body as a function of the magnitude of the force applied to the knee joint and the length of the moment arm 110. The interaction of these forces can also generate other reactions in the body such as twisting of the hip joint as well. The magnitude of the force applied to the knee joint may be addressed by a patient losing weight (which is why such joint problems are more common in overweight patients) and/or by altering a patient's gait.

The walking assistance devices of the present disclosure address the magnitude of the knee adduction moment. Reduction of the knee adduction moment reduces pressure on the medial compartment of the knee. Reduction of pressure on the medial compartment may reduce the chance of and/or delay development of osteoarthritis of the knee. In one example a patient uses one of the disclosed walking assistance devices in the hand opposite the knee being treated (e.g., using the walking assistance device in the left hand when treating the right knee) the device applies a force which urges the leg and knee of the patient to more of an upright position which reduces the length of the lever arm 114 thereby reducing the magnitude of the knee adduction moment 116. The contours of the bases portion of the disclosed walking assistance devices as previously described ensure that the device applies the greatest force at the peaks of the knee adduction moment as shown in FIG. 14. The shape of the base portion is selected so as to replicate the sinusoidal pattern of normal walking. By externalizing the normal sinusoidal action the disclosed devices help reinforce and/or support the correct motion in a patient's gait, particularly at both the heel strike and toe off portion of the gait when the knee adduction moment is greatest.

The disclosed walking assistance devices may also be used as a part of therapeutic or corrective rehabilitation programs which teach patients how to walk in such a manner as to potentially reduce or delay the need to knee replacement surgery, to improve the long term outcome of knee replacement surgery by teaching methods of walking which reduce the knee adduction moment, and to potentially slow the progression of knee osteoarthritis. In one example of a therapeutic treatment using a disclosed walking assistance device the device is a cane which is provided in a first configuration assembly having a particular base portion, shaft portion length, shaft angle relative to the base portion, spring tension, and handle portion. The patient's gait while walking is monitored and potentially recorded while using the cane in this first configuration. The knee adduction moment of the patient while walking is also monitored using pressure plates, sensors, and the like. The configuration of the cane is then adjusted to a second configuration assembly by altering one or more of the base portion, shaft length, shaft angle, spring tension, and/or handle portion. Optionally, the hand in which the patient uses the cane may also be altered (i.e., switched between the hand opposite the knee being treated to the hand on the same side as the knee being treated). The patient's gait while walking is monitored and potentially recorded while using the cane in this second configuration. The knee adduction moment of the patient while walking is also monitored. The knee adduction moments between the first configuration and second configuration are then compared and the cane once again adjusted as desired so as to optimize the knee adduction moment of the patient while walking with the cane. Generally this will result in a cane configuration which minimizes the knee adduction moment in the patient. In some instances other factors may also be included in determining which cane configuration is optimal for a particular patient. For example, a longer cane shaft might minimize the knee adduction moment for a particular patient, but it may also cause undue fatigue in the patient's shoulder so a shorter shaft might be used.

A patient's gait may also be rechecked after a period of time of using one cane configuration to see if further adjustment to the cane configuration is necessary. For example, a patient may be given a cane in a particular configuration and then have their gate rechecked after a month of walking with the device. The configuration of the cane may be further adjusted after such a period of use in response to changes in the patient's gait or further configuration adjustments may be made a predetermined intervals (e.g., every month, every three months, etc). Optionally further rechecking and adjustment may be performed as desired. The period of time between checking a particular patient's gait may vary as desired. In other examples, a patient's gait may be monitored over a period of time both with and without a particular cane to determine if sustained use of the cane has retrained the patient's gait such that the cane is less necessary. For example, after a period of using a cane having a particular configuration a patient may be asked to walk for a week without the cane. At the end of the week the patient's gait may be checked again to see if the patient is able to maintain a corrected gait without use of the cane. The period of time monitoring a particular patient's gait may vary as desired (e.g., weeks, months, years). In this sense the disclosed walking devices may be seen as a system of devices which evolve over time as a particular patient's gait improves/deteriorates.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. It will be appreciated that certain features and/or properties of the present disclosure, such as relative dimensions or angles, may not be shown to scale. As noted above, the teachings set forth herein are applicable to a variety of different instruments, implements, and the like having a variety of different structures than those specifically described herein. Other aspects, features, and advantages will be apparent upon an examination of the attached drawings and appended claims. As used herein, the articles "a" and "an" are intended to include one or more items, and may be used interchangeably with "at least one." Where only one item is intended, the term "one" or similar language is used. Also, as used herein, the terms "has," "have," "having," or the like are intended to be open-ended terms.

What is claimed is:

1. A method of customizing a cane system comprising:

placing the cane system in a first assembly configuration having a first combination of rocker bottom foot profile, shaft length, shaft angle, and return spring force in a return spring coupled between a rocker bottom foot and a handled shaft;

adjusting the cane system from the first assembly configuration to a second assembly configuration having a second combination of rocker bottom foot profile, shaft length, shaft angle, and return spring force;

monitoring a knee adduction moment in a patient user ambulating with the use of the cane system in the first assembly configuration;

monitoring a knee adduction moment in the patient user ambulating with the use of the cane system in the second assembly configuration; and customizing the cane system to the patient user based on the knee adduction moment of the patient user in each of the first assembly configuration and the second assembly configuration.

2. The method of claim 1, wherein a portion of the rocker bottom foot profile comprises a flat surface.

3. The method of claim 1, further comprising:

allowing the patient user to ambulate with the customized cane system for a predetermined period of time;

monitoring a knee adduction moment in the patient user after said predetermined period of time; and further customizing the cane system to the patient user based on the knee adduction moment of the patient user with the customized cane system.

4. The method of claim 3, wherein the predetermined period of time is at least one week.

5. The method of claim 3, wherein the predetermined period of time is at least one month.

6. A method of customizing a cane system to a user, the cane system including at least one handled shaft, at least one rocker bottom foot, a connecting structure for coupling the handled shaft to the at least one rocker bottom foot, and at least one return spring positionable in the connecting structure, the method comprising:

adjusting the cane system among a plurality of different assembly configurations, each of the assembly configurations including a different combination of rocker bottom foot profile, shaft length, shaft angle, and return spring force;

monitoring a knee adduction moment in a patient user ambulating with the cane system in each one of the plurality of different assembly configurations;

determining a knee adduction moment of least magnitude in the patient user based on the monitoring of the knee adduction moment;

associating the knee adduction moment of least magnitude with one of the plurality of different assembly configurations; and customizing the cane system to the user in the one of the plurality of different assembly configurations associated with the knee adduction moment of least magnitude.

7. The method of claim 6, wherein a portion of the rocker bottom foot profile comprises a flat surface.

8. The method of claim 6, further comprising:

allowing the patient user to ambulate with the customized cane system associated with the knee adduction moment of least magnitude for a predetermined period of time;

subsequently monitoring a knee adduction moment in the patient user after said predetermined period of time; and further customizing the cane system to the patient user based on the subsequently monitored knee adduction moment of the patient user.

9. The method of claim 8, wherein the predetermined period of time is at least one week.

10. The method of claim 8, wherein the predetermined period of time is at least one month.

* * * * *